(12) United States Patent
Chen et al.

(10) Patent No.: US 10,832,162 B2
(45) Date of Patent: Nov. 10, 2020

(54) MODEL BASED DATA PROCESSING

(71) Applicant: International Business Machines Corporation, Armonk, NY (US)

(72) Inventors: Boliang Chen, Shanghai (CN); Stephen Mingyu Chu, Beabercreek, OH (US); Jing Chang Huang, Shanghai (CN); Dong Sheng Li, Shanghai (CN); Junchi Yan, Shanghai (CN); Weipeng Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1099 days.

(21) Appl. No.: 15/259,866

(22) Filed: Sep. 8, 2016

(65) Prior Publication Data

US 2018/0068224 A1    Mar. 8, 2018

(51) Int. Cl.
    *G06N 20/00* (2019.01)
    *G06N 20/20* (2019.01)
    *G06N 20/10* (2019.01)

(52) U.S. Cl.
    CPC .............. *G06N 20/00* (2019.01); *G06N 20/10* (2019.01); *G06N 20/20* (2019.01)

(58) Field of Classification Search
    CPC ......... G06N 20/00; G06N 20/10; G06N 20/20
    USPC .......................................................... 706/12
    See application file for complete search history.

(56) References Cited

U.S. PATENT DOCUMENTS

| | | | |
|---|---|---|---|
| 7,698,235 B2 | 4/2010 | Kuroiwa | |
| 8,996,452 B2 | 3/2015 | Danciu et al. | |
| 2003/0088565 A1 | 5/2003 | Walter et al. | |
| 2011/0131157 A1* | 6/2011 | Iyer | G06Q 30/0251 706/12 |
| 2014/0188768 A1* | 7/2014 | Bonissone | G06N 20/00 706/12 |

(Continued)

FOREIGN PATENT DOCUMENTS

| | | |
|---|---|---|
| CN | 103631753 A | 3/2014 |
| CN | 103744924 A | 4/2014 |

(Continued)

OTHER PUBLICATIONS

Caruana et al., "Ensemble Selection From Libraries of Models," Proceedings of the 21st International Conference on Machine Learning, 2004, 9 pages.

(Continued)

*Primary Examiner* — Shane D Woolwine
(74) *Attorney, Agent, or Firm* — Amin, Turocy & Watson, LLP (57) ABSTRACT

Techniques for model based data processing are proposed. In one example, a computer-implemented method is as follows. A first model is determined from a first category of data processing models and a second model is determined from a second category of data processing models. The second category can be different from the first category in some instances. Performance of a first combined model of the first and second models can be compared with performance of the first model. A target model for processing data can be selected from the first combined model and the first model based on the comparing.

20 Claims, 4 Drawing Sheets

(56) References Cited

U.S. PATENT DOCUMENTS

2015/0379427 A1* 12/2015 Dirac .................. G06N 20/00
706/12
2016/0352764 A1* 12/2016 Mermoud ........... H04L 63/1425

FOREIGN PATENT DOCUMENTS

| EP | 1378855 A2 | 1/2004 |
|---|---|---|
| WO | 03075187 A1 | 9/2003 |

OTHER PUBLICATIONS

Chipman et al, "Bayesian Ensemble Learning," Proceedings of the 19th International Conference on Neural Information Processing Systems, 2006, pp. 265-272.

Jawanpuria et al., "Efficient Rule Ensemble Learning Using Hierarchical Kernels," Proceedings of the 28th International Conference on Machine Learning, 2011, 8 pages.

Bai et al., "A Bayesian Framework for Online Classifier Ensemble," Proceedings of the 31st International Conference on Machine Learning, 2014, 9 pages.

Mendes-Moreira et al., "Ensemble Learning: A Study on Different Variants of the Dynamic Selection Approach," Proceedings of the 6th International Conference on Machine Learning and Data Mining in Pattern Recognition, 2009, pp. 191-205.

Sun et al., "Bagging Ensemble Selection for Regression," Proceedings of the 25th Australasian Joint Conference on Advances in Artificial Intelligence, 2012, pp. 695-706, vol. 7691.

Indurkhya et al., "Rule-Based Ensemble Solutions for Regression," Lecture Notes in Computer Science, Machine Learning and Data Mining in Pattern Recognition, 2001, pp. 62-72, vol. 2123.

"BigML," 2016, BigML, Inc., Retrieved from https://bigml.com/features on Sep. 7, 2016, 6 pages.

"Statistica," 2016, StatSoft Inc., Retrieved from http://www.statsoft.com/Products/STATISTICA-Features/Analytic-Modules on Sep. 8, 2016, 5 pages.

Bloom, "WiseRF Introduction and Benchmarks," Nov. 22, 2012, Wise.io, Retrieved from http://www.wise.io/blog/wiserf-introduction-and-benchmarks on Sep. 7, 2016, 4 pages.

* cited by examiner

MODEL BASED DATA PROCESSING

BACKGROUND

The subject disclosure relates to data processing, and more specifically, to model based data processing.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate model based data processing are described.

In one aspect, a computer-implemented method is proposed. The computer-implemented method can comprise determining, by an electronic device operatively coupled to a processor, a first model from a first category of data processing models. The computer-implemented method can also comprise determining, by the electronic device, a second model from a second category of data processing models, the second category being different from the first category. The computer-implemented method can also comprise comparing, by the electronic device, performance of a first combined model of the first and second models with performance of the first model. The computer-implemented method can also comprise selecting, by the electronic device, a target model for processing data from the first combined model and the first model based on the comparing.

In another aspect, an electronic device is proposed. The electronic device can comprise: a processing unit; and a memory operatively coupled to the processing unit and that stores computer executable instructions that, based on execution by the processing unit, facilitate performance of acts. The acts can comprise determining a first model from a first category of data processing models. The acts can also comprise determining a second model from a second category of data processing models, the second category being different from the first category. The acts can also comprise comparing performance of a first combined model of the first and second models with performance of the first model. The acts can also comprise selecting a target model for processing data from the first combined model and the first model based on the comparing.

In yet another aspect, a computer program product for model based data processing is proposed. The computer program product can comprise a computer readable storage medium having program instructions embodied therewith. The program instructions can be executable by an electronic device to cause the electronic device to determine a first model from a first category of data processing models and determine a second model from a second category of data processing models, the second category being different from the first category. The program instructions can be executable by an electronic device to also cause the electronic device to compare performance of a first combined model of the first and second models with performance of the first model, and select a target model for processing data from the first combined model and the first model based on the comparing.

It is to be understood that the Summary is not intended to identify key or essential features of embodiments of the present disclosure, nor is it intended to be used to limit the scope of the present disclosure. Other features of the present disclosure will become easily comprehensible through the description below.

DESCRIPTION OF THE DRAWINGS

Throughout the drawings, the same or similar reference numerals represent the same or similar elements.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A recommendation system can be widely used in a variety of fields. For example, recommendation systems can be used in sales and marketing, health care, and/or cognitive computing fields. A recommendation system can recommend or predict products for customers based on a dataset for the customers. However, in some instances, the dataset is very sparse and small. For example, there may be only thousands of potential customers and dozens of products in a certain customer project. The recommendation system typically has to train models on the sparse and small dataset to generate a prediction. As a result, the prediction can be inefficient and generation of the prediction can be time consuming.

Principles of the present disclosure will now be described with reference to some example embodiments. It is to be understood that these embodiments are described only for the purpose of illustration and to help those skilled in the art to understand and implement one or more embodiments of the present disclosure, without suggesting any limitation as to the scope of the disclosure. The disclosure described herein can be implemented in various manners other than those describe below.

As used herein, the terms "includes" and its variants are to be understood as open-ended terms that mean "includes, but is not limited to." The term "based on" is to be understood as "based at least in part on." The term "one embodiment" and "an embodiment" are to be understood as "at least one embodiment." The term "another embodiment"

is to be understood as "at least one other embodiment." Other definitions, explicit and implicit, are included below.

Figure 1:
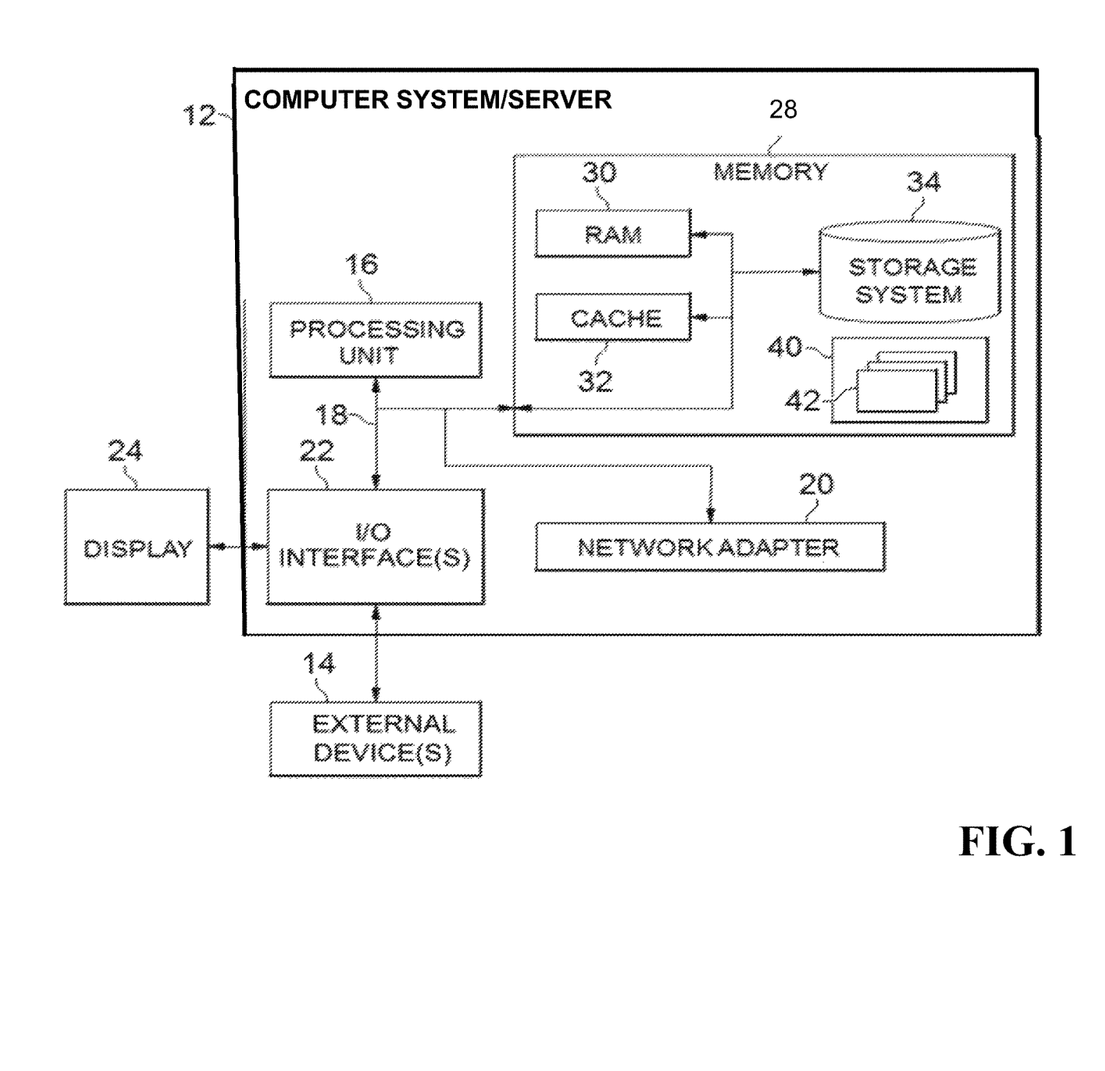
FIG. 1 is a block diagram of an example, non-limiting electronic device in which one or more embodiments of the present disclosure can be implemented.

FIG. 1 is a block diagram of an example, non-limiting electronic device in which one or more embodiments of the present disclosure can be implemented. The electronic device can be or include the computer system/server 12 in some embodiments. The computer system/server 12 can be employed to implement one or more of the embodiments of the present disclosure. Computer system/server 12 is only illustrative and is not intended to suggest any limitation as to the structure of the electronic device and/or the scope of use or functionality of embodiments of the disclosure described herein.

The components of computer system/server 12 can include, but are not limited to, one or more processing units 16, a system memory 28, and a bus 18 that couples various system components including system memory 28 to processing unit 16. As used herein, the term "processing unit" should be understood to be interchangeable with the term "processor."

Bus 18 can represent one or more of any of several types of bus structures, including a memory bus or memory controller, a peripheral bus, an accelerated graphics port or a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media can be any available media that is accessible by computer system/server 12, and it can include both volatile and non-volatile media, as well as removable and non-removable media.

System memory 28 can include computer system readable media in the form of volatile memory, such as random access memory (RAM) 30 and/or cache memory 32. Computer system/server 12 can further include other removable or non-removable, volatile or non-volatile computer system storage media. By way of example only, storage system 34 can be provided for reading from and/or writing to a non-removable, non-volatile magnetic media (not shown and typically called a "hard drive"). Although not shown, a magnetic disk drive for reading from and/or writing to a removable, non-volatile magnetic disk (e.g., a "floppy disk"), and an optical disk drive for reading from and/or writing to a removable, non-volatile optical disk such as a compact disc read-only memory (CD-ROM), digital versatile disc-read only memory (DVD-ROM) or other optical media can be provided. In such instances, one or more of the disk drives can be connected to bus 18 by one or more data media interfaces. As will be further depicted and described below, memory 28 can include at least one computer program product having a set of (or, in some embodiments, at least one) computer program modules that are configured to carry out the functions of one or more of the embodiments of the disclosure.

Program/utility 40, having a set or (or, in some embodiments, at least one) program modules 42, can be stored in memory 28. By way of example, and not limitation, other aspects that can be stored in memory 28 can include an operating system, one or more application programs, other program modules, and program data. The operating system, one or more application programs, other program modules, and/or program data or some combination thereof can include an implementation of a networking environment. Program modules 42 can generally carry out the functions and/or methodologies of one or more embodiments of the disclosure as described herein.

Computer system/server 12 can also communicate with one or more external devices 14 (e.g., a keyboard, a pointing device, a display 24), one or more devices that enable a user to interact with computer system/server 12 and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN) and/or a public network (e.g., the Internet) via network adapter 20. As depicted, network adapter 20 can communicate with the other components of computer system/server 12 via bus 18. It should be understood that although not shown, other hardware and/or software components can be used in conjunction with, or included within, computer system/server 12. Examples, include, but are not limited to: microcode, device drivers, redundant processing units, external disk drive arrays, redundant array of independent disks (RAID) systems, tape drives, and/or data archival storage systems.

Figure 2:
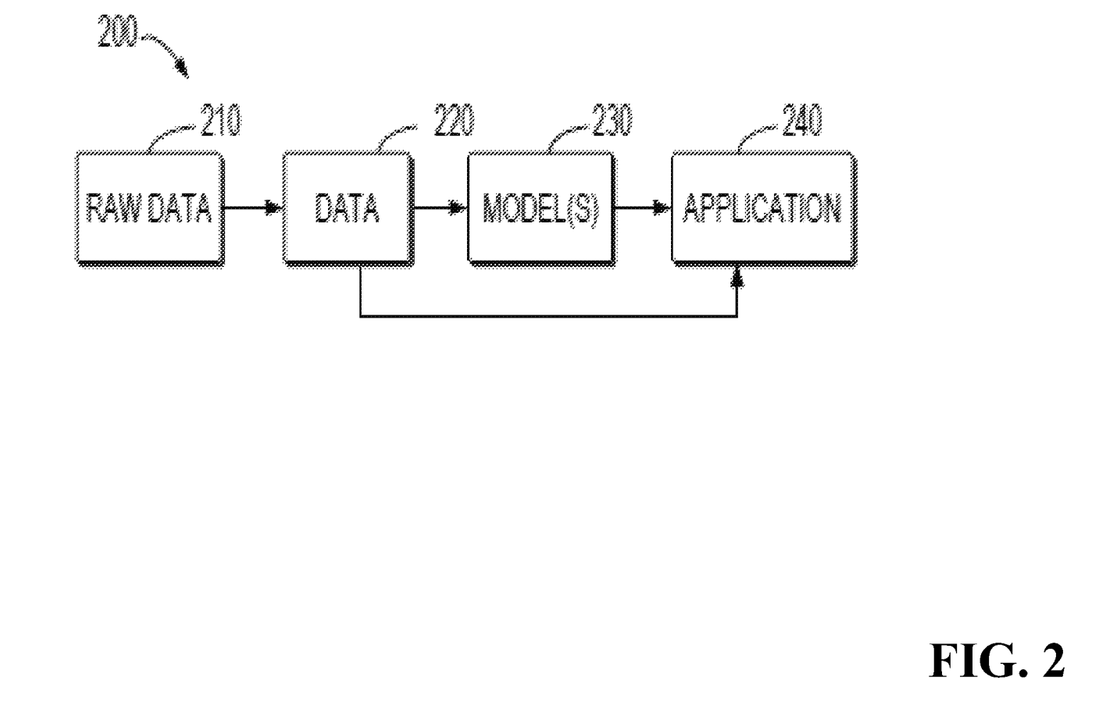
FIG. 2 is a schematic diagram of a data processing method.

FIG. 2 shows a schematic diagram of a paradigm 200 for data processing. Raw data 210 can be collected and/or received from one or more different sources. The raw data 210 can include, for example, demographic information of the customers, search history of the customers, purchase history of the customers, location of the customers and the like. The raw data 210 can be preprocessed to separate data of interest from noisy data, and/or to generate data 220. For example, the purchase history of the customers can be separated from other noisy data to generate the data 220. The data 220 can be continually extracted, updated and managed in various iterations and/or embodiments.

Data processing models 230 can be applied to the data 220 to generate prediction results. Data processing models 230 can be, for example, machine-learning models that predict future behaviors and responses of the customers, such as the Gradient Boosting Decision Tree (GBRT) model, Support Vector Machine (SVM) model, Logistic Regression (LR) model, Random Forest (RF) model, etc. The prediction results can be, for example, the potential possibilities of the customer purchasing a certain product. The prediction results can be communicated to application 240 to facilitate making a decision. In some embodiment, the data 220 can be directly communicated to the application 240 to facilitate making decisions.

In various embodiments, data processing models 230 of FIG. 2 can be a combined model. The use of the combined data processing models can provide a simple and effective solution with low time complexity for processing sparse and a small data set.

Figure 3:
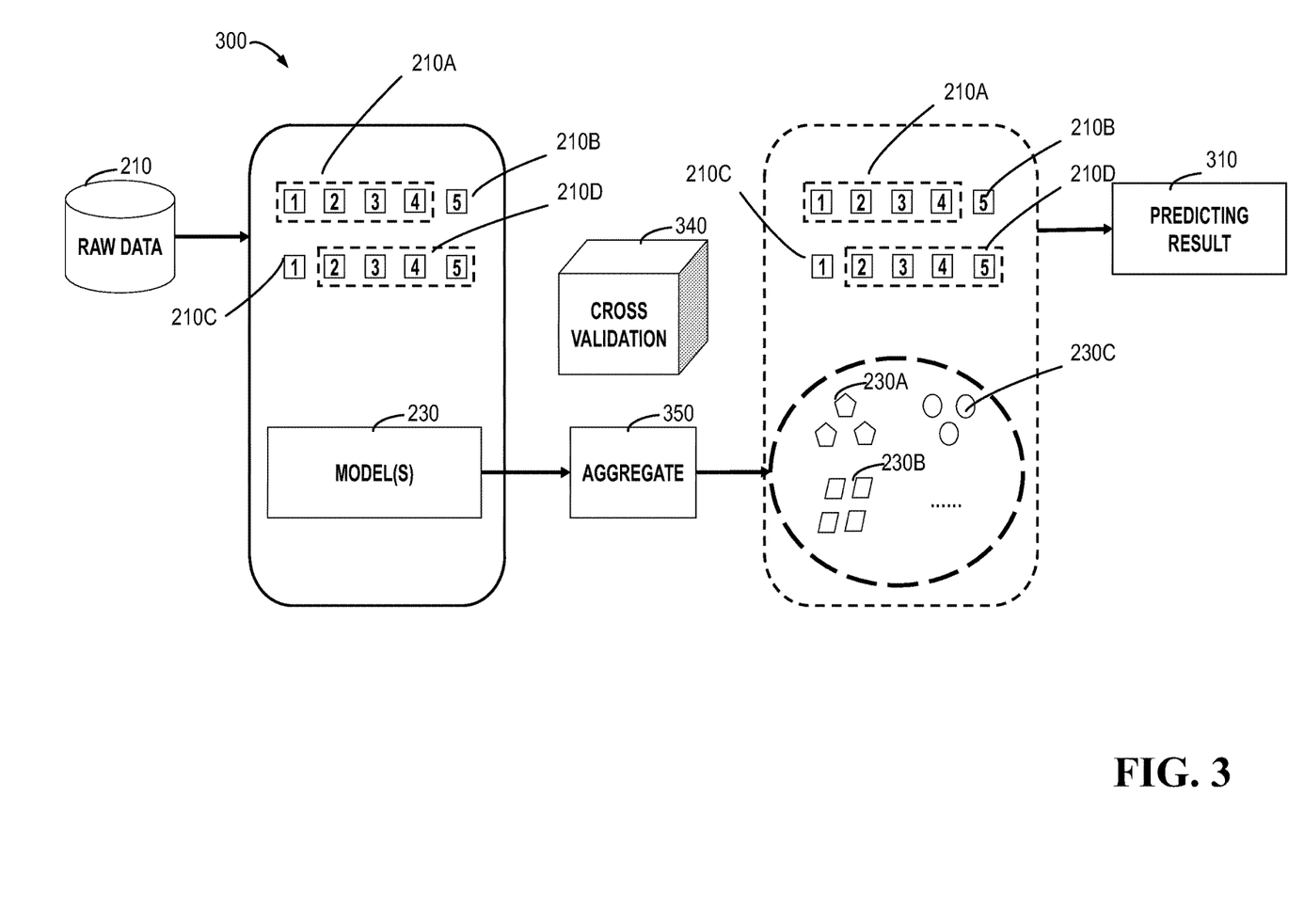
FIG. 3 is a schematic diagram of an example, non-limiting data processing computer-implemented method in accordance with one or more embodiments of the present disclosure.

FIG. 3 is a schematic diagram 300 of data processing in accordance with one or more embodiments of the present disclosure. As shown, the raw data 210 can be divided into a plurality of datasets (e.g., dataset 1, dataset 2, dataset 3, dataset 4, and dataset 5) for cross validation 340. For example, the datasets 1, 2, 3 and 4 can be formed into training dataset 210A and the dataset 5 can be formed into testing dataset 210B. Further, the datasets 2-5 can be formed into training dataset 210D and the dataset 1 can be formed into testing dataset 210C. The cross validation methods can include, for example, Random K-fold, Stratified K-fold, and Time-based K-fold etc.

A plurality of data processing models 230 can be aggregated 350 into a plurality of categories of data processing models based on at least one of a type, a predicting result, a performance and/or a defined number of categories of the data processing models, such as data processing models 230A, 230B, and 230C. In some embodiments, the data processing models 230 can be customized. For example, in various different embodiments, new data processing models can be added into the data processing models 230; data processing models can be removed from the data processing models 230; and/or parameters of the data processing models can be adjusted to update the data processing models 230. The parameters of the data processing models can include, but are not limited to, the type of the data processing models, the number of users, the dimension of data processing models, etc.

Representative data processing models can be determined from the data processing models 230A, 230B, and 230C. In some embodiments, the representative data processing models can be applied to the training dataset 210A to generate a first target model, and the first target model can be applied to the testing dataset 210B to validate the performance the first target model. Further, the aggregated models 230A, 230B, and 230C can be applied to the training dataset 210D to generate a second target model, and the second target model can be applied to the testing dataset 210C to validate the performance the second target model.

In some embodiments, the representative models can be applied to the features extracted from the training datasets 210A, 210D and the testing datasets 210B, 210C to generate the target model. For example, data about the purchase history of the customers can be extracted from the datasets as the features. In some embodiments, the representative models can be applied to the training datasets 210A, 210D to generate a target model, and the target model can be applied to the testing datasets 210B, 210C to validate the performance of the target model.

In some embodiments, the performance can represent similarity between the predicting result 310 of a model and the actual result. For example, the predicting result 310 can indicate that the potential possibility of the customer purchasing a certain product is 0.7, while the actual result is that the customer indeed purchased this product. In this case, then, the performance of the model is 0.7. In some embodiments, the first or second target model with the best performance can be selected as the target model. Alternatively, the first and second target models can be combined into the target model. For example, the target model can be the average values from the first and second target models.

In accordance with one or more embodiments of the present disclosure, the models for processing data can be updated and/or optimized iteratively. As a result, in one or more embodiment, the target model can achieve high performance with low time complexity. Some example implementations of model aggregation, representative model generation, and target model generation process will now be described.

Figure 4:
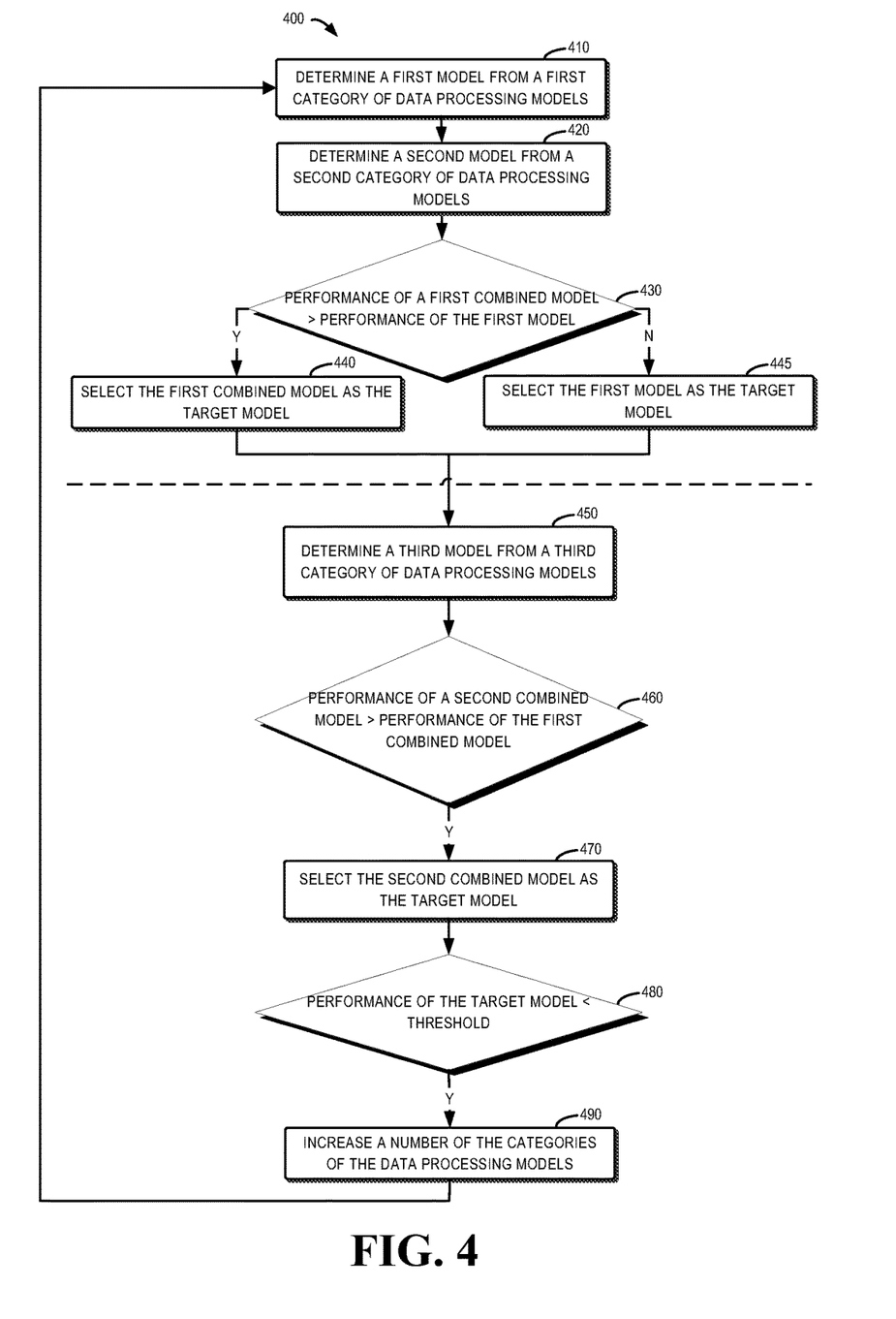
FIG. 4 is a flow chart of an example, non-limiting computer-implemented method in accordance with one or more embodiments of the present disclosure.

FIG. 4 is a flow chart of a method 400 for processing data in accordance with embodiments of the present disclosure. The method 400 can be implemented via the electronic device (e.g., computer system/server 12) shown in FIG. 1. The method 400 is entered at 410, where a first model can be determined from a first category of data processing models. In some embodiments, the first model can be initially selected as the target model.

At 420, a second model can be determined from a second category of data processing models. The first and second categories of data processing models can be aggregated from a plurality of data processing models based on at least one of a type, a predicting result, performance and/or a defined number of categories of the data processing models. For example, K-means clustering can be used to aggregate the plurality of data processing models into the first and second categories.

In some embodiments, the first and second models can be models with the best performance in the first and second categories of data processing models, respectively. Alternatively, the first and second models can be the combination of models in the first and second categories of data processing models, respectively. For example, the first and second models can be the average of models in the first and second categories of data processing models, respectively.

At 430, performance of a first combined model of the first and second models can be compared with performance of the first mode. In some embodiments, the first combined model can be generated by weighting the first and second models. For example, the first combined model can be generated by the following equation:

$$M\_t=(1-w){\times}M\_1+w{\times}M\_2$$

where M_t can represent the first combined model, (1−w) can represent the weight of the first model, M_2 can represent the first model, w can represent the weight of the second model, and M_2 can represent the second model. Here w is a weight parameter between 0 and 1.

The optimal weight for the first and second models can be found to generate the first combined model. For example, the optimal weight can be found based on greedy linear optimization. In some embodiments, w can be traversed to obtain the first combined model with the best performance For example, the value of w can be initially set to 0, and the increment of w can be set to 0.1. The initially obtained first combined model (w=0) can be applied to the training dataset 210A shown in FIG. 3, and performance of the first combined model can be obtained. Then, the value of w can be incremented by 0.1. The obtained first combined model (w=0.1) can also be applied to the training dataset 210A, and performance of the first combined model can be obtained. The process can be repeatedly performed until w=1. Alternatively, the process can be performed until a defined number of repetitions have been reached. The combined model with the best performance can be selected as the first combined model.

If the performance of the first combined model is higher than the performance of the first model, then at 440, the first combined model can be selected as the target model. Otherwise, at 445, the first model can be selected as the target model. As such, the model with the best performance can be selected as the target model. Accordingly, the target model can be a combined model integrating insights of a plurality of data processing models, and thus the target model can be more accurate and stable than a single model.

In some embodiments, optionally, the target model can be iteratively optimized and updated at 450, 460, 470, 480 and 490. In some other embodiments, optionally, the target model can be generated and iteratively optimized and updated at 450, 460, 470, 480 and 490 without being generated at 430, 440 and 445. Specifically, at 450, a third model can be determined from a third category of data processing models. As described above, the third category of data processing models can be aggregated from a plurality of data processing models based on one or more of a type, a predicting result, performance and a defined number of categories of the data processing models. For example, K-means clustering can be used to aggregate the plurality of data processing models into the first to third categories. Of course, any other suitable clustering approaches, either currently known in the art or to be developed in future, can be used in connection with one or more embodiments of the present disclosure.

In some embodiments, the third model can be a model with the best performance in the third category of data processing models. Alternatively, the third model can be a combination of models in the third category of data processing models. For example, the third model can be the average of models in the third category of data processing models.

At 460, performance of a second combined model of the first combined model and the third model can be compared with the performance of the first combined model. In some embodiments, the second combined model can be generated by weighting the first combined model and the third model. The generation process of the second combined model can be similar to that of the first combined model, and thus details are omitted.

If the performance of the second combined model is higher than the performance of the first combined model, at 470, the second combined model can be selected as the target model. Otherwise, the target model can remain unchanged. As such, in the case that the second combined model is of higher performance, the target model can be further optimized.

At 480, it can be determined whether a cease condition for updating of the target model is satisfied. For example, in some embodiments, the cease condition is related to the performance. In such embodiments, performance of the target model can be compared with a defined threshold. For example, the performance of the target model can be obtained based on the cross validation described above with reference to FIG. 3. If the performance of the target model is higher than or equals to a defined threshold, the current target model can be determined to be the target model. The predicting result can be generated by applying this target model to the entire dataset. Otherwise, the number of the categories of the data processing models can be increased to improve the accuracy of the target model. Then, the method 400 can proceed back to 410.

It should be appreciated that the performance is just an example of a cease condition, without suggesting any limitations as to the scope of the disclosure. Any other suitable cease conditions can be used as well. For example, the iteration can cease if there is no other candidate model. As another example, the iteration can cease if the number of iterations has reached a defined threshold.

It should be appreciated that the dashed line in the flow chart indicates that steps below the dashed line (steps 450, 460, 470, 480, 490) are optional. For example, the first model can be directly selected as the target model, and the predicting result can be generated by applying the first model to the entire dataset.

It has been proved that the time complexity of the method 400 can be $O(i*K*N*d)+O(K*K*d)$, where O represents time complexity, i represents iteration time of aggregations, K represents a configurable category number, N represents data processing model number, and d represents dataset number. According to this equation, the scale of the method 400 can be linearly correlated with data processing model number and dataset number. As an example, for enterprise data, K is usually set as 10, i is usually less than 100, N can be 100, and d can be 10,000.

In comparison with the conventional solutions, one or more embodiments of the method 400 can achieve high performance with low time complexity (e.g., low processing time). The comparisons between the method 400 and the conventional solutions are shown in Tables 1 and 2.

TABLE 1

| Model | Single Model A (User-based, NN = 5) | Single Model B (User-based, NN = 20) | Single Model C (Item-based, NN = 10) | Method 400 |
|---|---|---|---|---|
| Performance | 0.74 | 0.82 | 0.78 | 0.88 |

TABLE 2

| Model | Combined Model A (Average) | Combined Model B (LR) | Combined Model C (GBRT) | Method 400 |
|---|---|---|---|---|
| Time | 1 s | 2 min | 15 min | 10 s |
| Performance | 0.79 | 0.77 | 0.86 | 0.88 |

As shown in Table 1, in comparison with the single model A (User-based, K=5), single model B (User-based, K=20), and single model C (Item-based, K=10), the performance of the method 400 in accordance with one or more embodiments of the present disclosure is higher than the performance of single models A-C. The user-based model recommends items to a particular user based on preferences of other users (which are also referred as neighbor) who share a common preference with the particular user. The item-based model recommends items to the user based on similarity between items preferred by the user and items to be recommended to the used. NN represents neighbor number. Additionally, as shown in Table 2, in comparison with the combined model A (Average), the combined model B (LR), and the combined model C (GBRT), the time complexity of the method in accordance with embodiments of the present disclosure can be much lower than the combined models B and C, and the performance of the method 400 is higher than the performance of the combined models A-C.

The system (e.g., computer system/server 12) and/or methods (e.g., method 400) described herein can employ hardware and/or software to solve problems that are highly technical in nature (e.g., model based data processing, combining models, determining performance of various different combinations of models), that are not abstract and that cannot be performed as a set of mental acts by a human. Further, some of the processes performed may be performed by a specialized computer (e.g., a computer that generates one or more predictions of products for particular consumers, a computer that performs cross validation, a computer that applies specific models to information) for carrying out defined tasks related to memory operations. The computer system/server 12 and/or components of the computer system/server 12 can be employed to solve new problems that arise through advancements in technology, computer networks, the Internet and the like. These new problems include, but are not limited to, recommending products, in some cases, via the Internet, to customers that have not been met or observed and/or without prior knowledge of past purchase history; selecting models for efficient performance and the like. The computer system/server 12 can provide technical improvements to processor systems and/or memory systems by improving processing efficiency of a processing unit (e.g., reducing the time until the processing unit generates a prediction, increasing a likelihood of accuracy of the processing unit prediction and the like).

Moreover, because raw data processing, application of models, etc. and the corresponding communication between components is established from a combination of electrical and mechanical components and circuitry, a human is unable to replicate or perform the operations described herein. Furthermore, a human is unable to communicate data for communication between various components of the computer system/server 12.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

The present disclosure may be a system, an apparatus, a device, a computer-implemented method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-selecting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining, by an electronic device operatively coupled to a processing unit, a first model from a first category of data processing models;
    determining, by the electronic device, a second model from a second category of data processing models, the second category being different from the first category;
    comparing, by the electronic device, performance of a first combined model of first and second models with performance of the first model, wherein the first combined model is computed based on weighting the first and second models by a value associated with the weight parameter, wherein the weight parameter is between 0 and 1, and wherein the first model is weighted by 1 minus the weight parameter and the second model is weighted by the weight parameter; and
    selecting, by the electronic device, a target model for processing data from the first combined model and the first model based on the comparing.

2. The computer-implemented method of claim 1, wherein the selecting a target model comprises:
    in response to determining that the performance of the first combined model is higher than the performance of the first model, selecting the first combined model as the target model; and
    in response to determining that the performance of the first combined model is equal to or lower than the performance of the first model, selecting the first model as the target model, wherein the selecting the first combined model or the selecting the first model results in reduced processing unit processing time.

3. The computer-implemented method of claim 1, further comprising:
    determining, by the electronic device, a third model from a third category of data processing models, the third category being different from the first category and the second category;
    comparing, by the electronic device, performance of a second combined model of the first combined model and the third model with the performance of the first combined model; and
    in response to determining that performance of the second combined model is higher than the performance of the first combined model, selecting, by the electronic device, the second combined model as the target model.

4. The computer-implemented method of claim 1, further comprising:
    comparing, by the electronic device, performance of the target model with a defined threshold; and
    in response to determining that the performance of the target model is lower than the defined threshold, increasing, by the electronic device, a number of categories of the data processing models.

5. The computer-implemented method of claim 4, further comprising:
    in response to determining that the performance of the target model is higher than or equal to the defined threshold, ceasing, by the electronic device, updating the target model.

6. The computer-implemented method of claim 1, further comprising:
    obtaining, by the electronic device, first and second categories of data processing models by aggregating data processing models selected from a group consisting of a type, a predicting result, a performance and a defined number of categories of the data processing models.

7. The computer-implemented method of claim 1, wherein the performance represents similarity between a predicting result of a respective model and an actual result.

8. An electronic device comprising:
    a processing unit; and
    a memory operatively coupled to the processing unit and that stores computer executable instructions that, based on execution by the processing unit, facilitate performance of acts, comprising:
    determining a first model from a first category of data processing models;
    determining a second model from a second category of data processing models, the second category being different from the first category;
    comparing performance of a first combined model of the first and second models with performance of the first model, wherein the first combined model is computed based on weighting the first and second models by a value associated with the weight parameter, wherein the weight parameter is between 0 and 1, and wherein the first model is weighted by 1 minus the weight parameter and the second model is weighted by the weight parameter; and
    selecting a target model for processing data from the first combined model and the first model based on the comparing.

9. The electronic device of claim 8, wherein the acts further include:

in response to determining that the performance of the first combined model is higher than the performance of the first model, selecting the first combined model as the target model; and in response to determining that the performance of the first combined model is equal to or lower than the performance of the first model, selecting the first model as the target model.

10. The electronic device of claim 8, wherein the acts further include:
determining a third model from a third category of data processing models, the third category being different from the first category and the second category;
comparing performance of a second combined model of the first combined model and the third model with the performance of the first combined model; and
in response to determining that performance of the second combined model is higher than the performance of the first combined model, selecting the second combined model as the target model.

11. The electronic device of claim 8, wherein the acts further include:
comparing performance of the target model with a defined threshold; and
in response to determining that the performance of the target model is lower than the defined threshold, increasing a number of categories of the data processing models.

12. The electronic device of claim 11, wherein the acts further include:
in response to determining that the performance of the target model is higher than or equal to the defined threshold, ceasing updating the target model.

13. The electronic device of claim 8, wherein the acts further include:
obtaining first and second categories of data processing models by aggregating data processing models based on a type, a predicting result, performance and a defined number of categories of the data processing models.

14. The electronic device of claim 8, wherein the performance represents a similarity between a prediction result of a respective model and an actual result, and wherein the processing unit efficiently determines the prediction result based on the selecting the target model.

15. A computer program product for model based data processing, the computer program product comprising a computer readable storage medium having program instructions embodied therewith, the program instructions executable by an electronic device to cause the electronic device to:
determine a first model from a first category of data processing models;
determine a second model from a second category of data processing models, the second category being different from the first category;
compare performance of a first combined model of first and second models with performance of the first model, wherein the first combined model is computed based on weighting of the first model and the second model by a weight parameter, wherein the weight parameter is between 0 and 1, and wherein the first model is weighted by 1 minus the weight parameter and the second model is weighted by the weight parameter; and
select a target model for processing data from the first combined model and the first model based on the comparing.

16. The computer program product of claim 15, wherein the program instructions are further executable by the electronic device to cause the electronic device to:
in response to determining that the performance of the first combined model is higher than the performance of the first model, select the first combined model as the target model; and
in response to determining that the performance of the first combined model is equal to or lower than the performance of the first model, select the first model as the target model.

17. The computer program product of claim 15, wherein the program instructions are further executable by the electronic device to cause the electronic device to:
determine a third model from a third category of data processing models, the third category being different from the first category and the second category;
compare performance of a second combined model of the first combined model and the third model with the performance of the first combined model; and
in response to determining that performance of the second combined model is higher than the performance of the first combined model, select the second combined model as the target model.

18. The computer program product of claim 15, wherein the program instructions are further executable by the electronic device to cause the electronic device to:
compare performance of the target model with a defined threshold;
in response to determining that the performance of the target model is lower than the defined threshold, increase a number of categories of the data processing models; and
in response to determining that the performance of the target model is higher than or equal to the defined threshold, cease updating the target model.

19. The computer program product of claim 15, wherein the program instructions are further executable by the electronic device to cause the electronic device to:
obtain first and second categories of data processing models by aggregating data processing models based on a type, a predicting result, performance and a defined number of categories of the data processing models.

20. The computer program product of claim 15, wherein the performance represents similarity between predicting result of a respective model and an actual result.

* * * * *